(12) United States Patent
Shimamura

(10) Patent No.: US 7,613,386 B2
(45) Date of Patent: *Nov. 3, 2009

(54) WATERPROOF CASE FOR PORTABLE DEVICE

(75) Inventor: Takashi Shimamura, Itabashi-ku (JP)

(73) Assignee: Ricoh Company, Ltd., Tokyo (JP)

( * ) Notice: Subject to any disclaimer, the term of this patent is extended or adjusted under 35 U.S.C. 154(b) by 692 days.

This patent is subject to a terminal disclaimer.

(21) Appl. No.: 11/091,475

(22) Filed: Mar. 29, 2005

(65) Prior Publication Data

US 2005/0167304 A1 Aug. 4, 2005

Related U.S. Application Data

(63) Continuation of application No. 10/101,740, filed on Mar. 21, 2002, now Pat. No. 7,050,712.

(30) Foreign Application Priority Data

Mar. 21, 2001 (JP) ............... 2001-080287

(51) Int. Cl.
*G03B 17/08* (2006.01)
(52) U.S. Cl. .............. 396/27; 396/25; 206/316.2
(58) Field of Classification Search ......... 206/316.2, 206/316.1, 316.3, 37, 775, 776, 811, 305, 206/320; 220/833, 835, 849; 396/27, 25, 396/6; 294/139, 908; 224/908
See application file for complete search history.

(56) References Cited

U.S. PATENT DOCUMENTS

| | | | |
|---|---|---|---|
| 2,172,348 A | | 9/1939 | Githens et al. |
| 2,573,885 A | * | 11/1951 | Whitman et al. ............. 396/27 |
| 3,019,715 A | | 2/1962 | Arnold et al. |
| 4,982,841 A | | 1/1991 | Goedecke |
| 5,508,766 A | | 4/1996 | Boyd et al. |
| 6,138,826 A | | 10/2000 | Kanamori et al. |

FOREIGN PATENT DOCUMENTS

| | | |
|---|---|---|
| GB | 2212138 A | 7/1989 |
| JP | 3-1573 | 1/1991 |
| JP | 3-63979 | 6/1991 |
| JP | 4-10374 | 1/1992 |
| JP | 4-355439 | 12/1992 |
| JP | 5-50779 | 7/1993 |
| JP | 8-186745 | 7/1996 |
| JP | 11-127371 | 5/1999 |
| JP | 2000-089330 | 3/2000 |
| JP | 2001-185871 | 7/2001 |

* cited by examiner

*Primary Examiner*—J. Gregory Pickett
(74) *Attorney, Agent, or Firm*—Oblon, Spivak, McClelland, Maier & Neustadt, L.L.P.

(57) ABSTRACT

A waterproof case for containing a portable device including at least one operation part offset in a direction perpendicular to an inserting direction of the portable device into the case body of the waterproof case, includes at least one operation part that operatively cooperates with the at least one operation part of the portable device, and a moving and holding device that moves the portable device in a direction perpendicular to the inserting direction of the portable device after the portable device is inserted into the case body and that holds the portable device in a moved position so as to operatively cooperate the at least one operation part of the portable device with the at least one operation part of the case body.

9 Claims, 8 Drawing Sheets

B-B

A-A

WATERPROOF CASE FOR PORTABLE DEVICE

BACKGROUND OF THE INVENTION

1. Field of the Invention

The present invention relates to a waterproof case for containing a portable device such as a digital camera, a video camera, a mobile phone, a personal digital assistance (PDA), etc.

2. Discussion of the Background

When using a portable device including a liquid crystal display (LCD) panel contained in a waterproof case, a user inputs operational instructions for the portable device with a touch of the LCD panel by use of forgers or by use of a pen through the waterproof case. In the waterproof case, because the LCD panel of the portable device is typically recessed, a cover of the waterproof case needs to cover the LCD panel so as to bring the LCD panel into tight contact with a part of the waterproof case corresponding to the LCD panel in a recessed direction of the LCD panel.

FIG. 10 illustrates a schematic perspective view of a waterproof case and a portable device according to a background art. Referring to FIG. 10, in a waterproof case 100, a rear cover 102 is hingedly mounted on a case body 101, and opens and closes a rear opening of the case body 101. A portable device 120 such as a digital camera including an LCD panel 121 and operation switches 122 is inserted into the case body 101 of the waterproof case 100 through the rear opening of the case body 101 by opening the rear cover 102. After the portable device 120 is inserted into the case body 101, the rear cover 102 is closed so that the waterproof case 100 is watertight. The rear cover 102 of the waterproof case 100 includes a transparent member 102a at a position corresponding to the LCD panel 121 of the portable device 120 contained in the waterproof case 100, and operation buttons 102b at positions corresponding to the operation switches 122 of the portable device 120.

The inserting direction of the portable device 120 is substantially the same as a recessed direction of the LCD panel 121 and a projecting direction of the operation switches 122. By closing the rear cover 102, the transparent member 102a and the operation buttons 102b arranged on an inner surface of the rear cover 102 are pressed against the LCD panel 121 and the operation switches 122 of the inserted portable device 120, respectively, in the inserting direction of the portable device 120. As a result, the transparent member 102a and the operation buttons 102b of the rear cover 102 are brought into tight contact with the LCD panel 121 and the operation switches 122 of the inserted portable device 120, respectively.

In the above-described background waterproof case 100 in which the inserting direction of the portable device 120 is substantially the same as the recessed direction of the LCD panel 121 and the projecting direction of the operation switches 122, there are concerns (1)-(3) as follows.

Because the rear cover 102 of the waterproof case 100 which covers a relatively wide surface of the portable device 120 is relatively large, a peripheral length of an O-ring (not shown) provided around the periphery of the rear cover 102 for maintaining the watertightness of the waterproof case 100 becomes relatively long. In this case, the secure waterproofness of the waterproof case 100 may be hard to obtain.

Because the rear cover 102 of the waterproof case 100 is relatively large, the rear cover 102 may tend to be deformed due to water pressure. The deformation of the rear cover 102 may result in water leakage.

Generally, a portable device having the above-described layout of the portable device 120 includes a cover for an electric battery or a cover for a compact flash (CF) card or a personal computer memory card (PC) that opens and closes in a direction perpendicular to a recessed direction of an LCD panel and a projecting direction of operation switches. For example, the portable device 120 includes a cover 123 for electric battery and a cover 124 for a CF card or a PC card at a left side surface of the portable device 120 in FIG. 10. When the waterproof case 100 contains the portable device 120, the cover 123 for electric battery and the cover 124 for a CF card or a PC card may not open and close unless the portable device 120 is removed from the waterproof case 100.

SUMMARY OF THE INVENTION

According to one aspect of the present invention, a waterproof case for containing a portable device including at least one operation part offset in a direction perpendicular to an inserting direction of the portable device into a case body of the waterproof case, includes at least one operation part configured to operatively cooperate with the at least one operation part of the portable device, and a moving and holding device configured to move the portable device in a direction perpendicular to the inserting direction of the portable device after the portable device is inserted into the case body and configured to hold the portable device in a moved position so as to operatively cooperate the at least one operation part of the portable device with the at least one operation part of the case body.

Objects, features, and advantages of the present invention will become apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
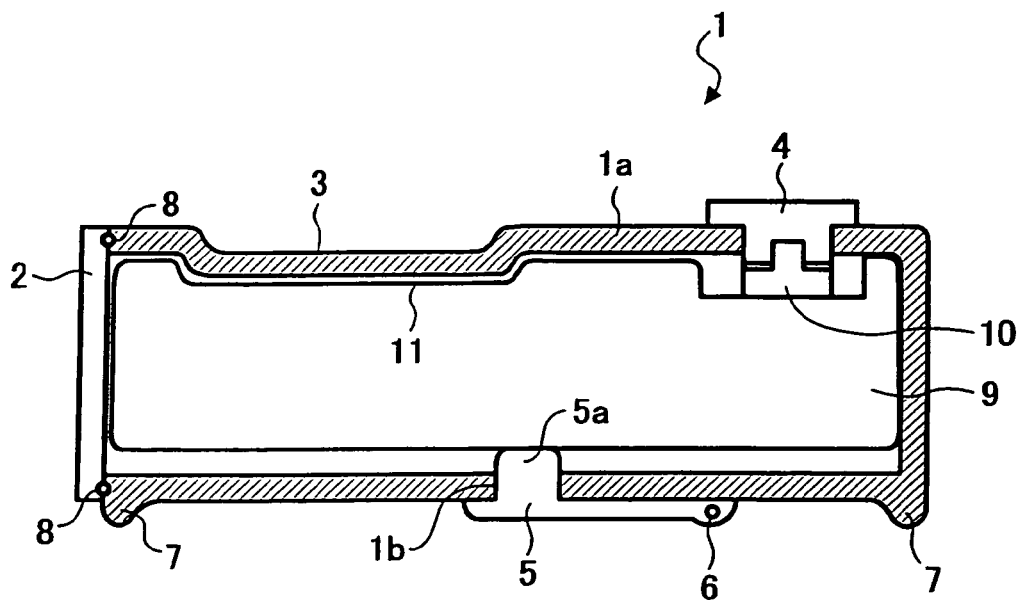
FIG. 1A is a schematic cross sectional view of a waterproof case after a portable device is inserted into the waterproof case according to an embodiment of the present invention.

Preferred embodiments of the present invention are described in detail referring to the drawings, wherein like reference numerals designate identical or corresponding parts throughout the several views.

Figure 1B:
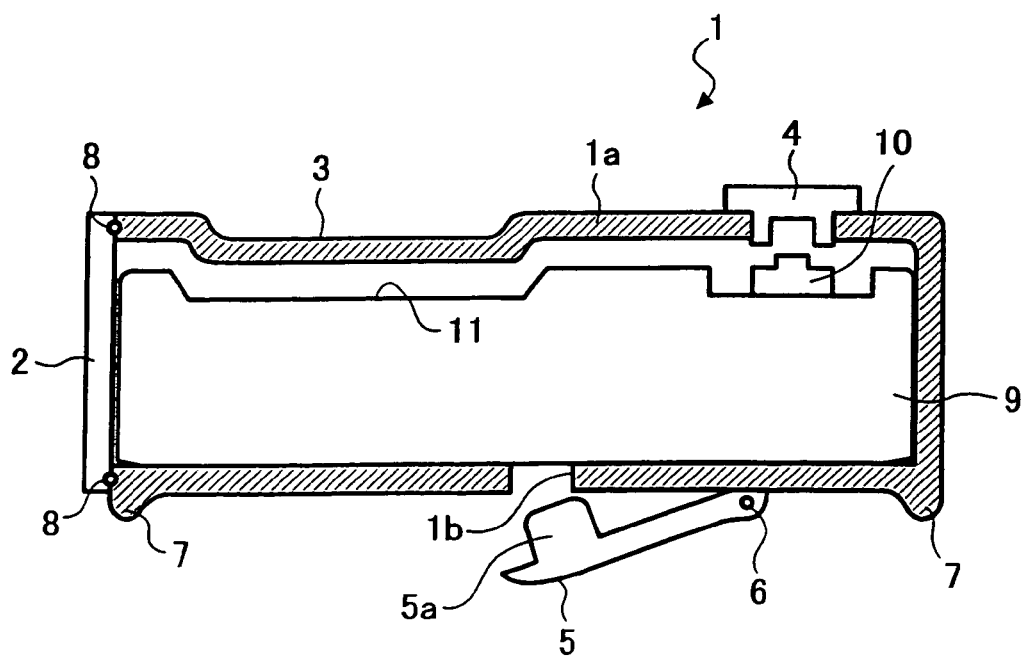
FIG. 1B is a schematic cross sectional view of the waterproof case of FIG. 1A in a state where the portable device is being inserted.
Figure 2A:
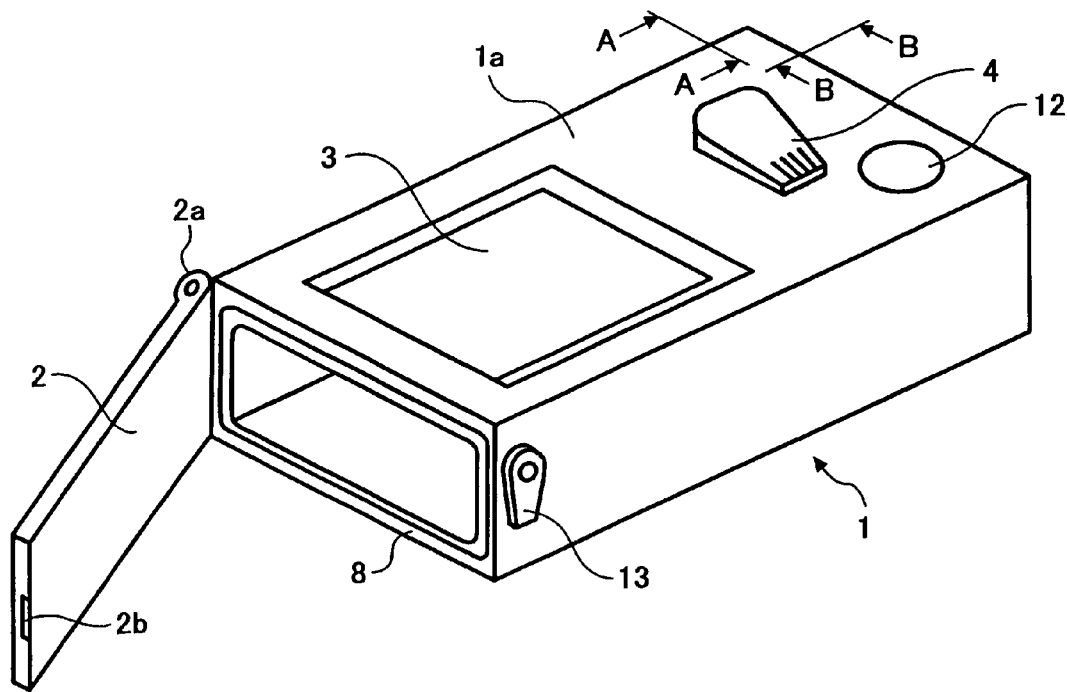
FIG. 2A is a schematic perspective view of the waterproof case of FIG. 1 before the portable device is inserted into the waterproof case.
Figure 2B:
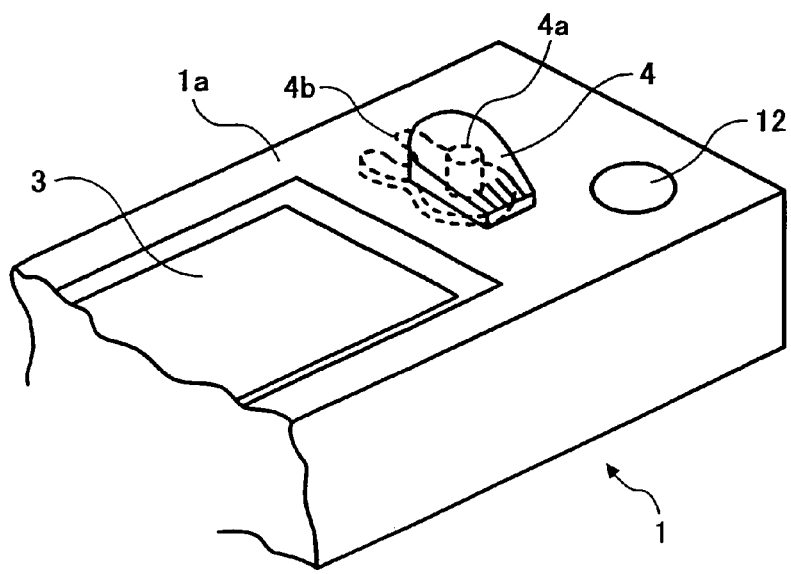
FIG. 2B is a schematic perspective view of the waterproof case, illustrating operation parts of the waterproof case corresponding to operation parts of the portable device.

FIG. 1A is a schematic cross sectional view of a waterproof case after a portable device is inserted into the waterproof case according to an embodiment of the present invention. FIG. 1B is a schematic cross sectional view of the waterproof case of FIG. 1A in a state where the portable device is being inserted. FIG. 2A is a schematic perspective view of the waterproof case of FIG. 1 before the portable device is inserted into the waterproof case. FIG. 2B is a schematic perspective view of the waterproof case illustrating operation parts of the waterproof case corresponding to operation parts of the portable device.

Referring to FIGS. 1A and 1B and FIGS. 2A and 2B, a waterproof case 1 for a portable device 9 such as a digital camera includes a case body 1a, a cover 2, a recessed part 3 corresponding to a liquid crystal display (LCD) panel 11 of the portable device 9, a first operation lever 4, a moving member 5 configured to move the portable device 9 inserted into the waterproof case 1 in a direction perpendicular to an inserting direction of the portable device 9, a rotation support shaft 6, projections 7 respectively provided at side edge parts of a bottom part of the case body 1a, an O-ring 8 provided between the cover 2 and the case body 1a to make the waterproof case 1 watertight and a second operation lever 12.

The waterproof case 1 is in a substantially flat rectangular shape and configured to contain the portable device 9 inside thereof.

Figure 3:
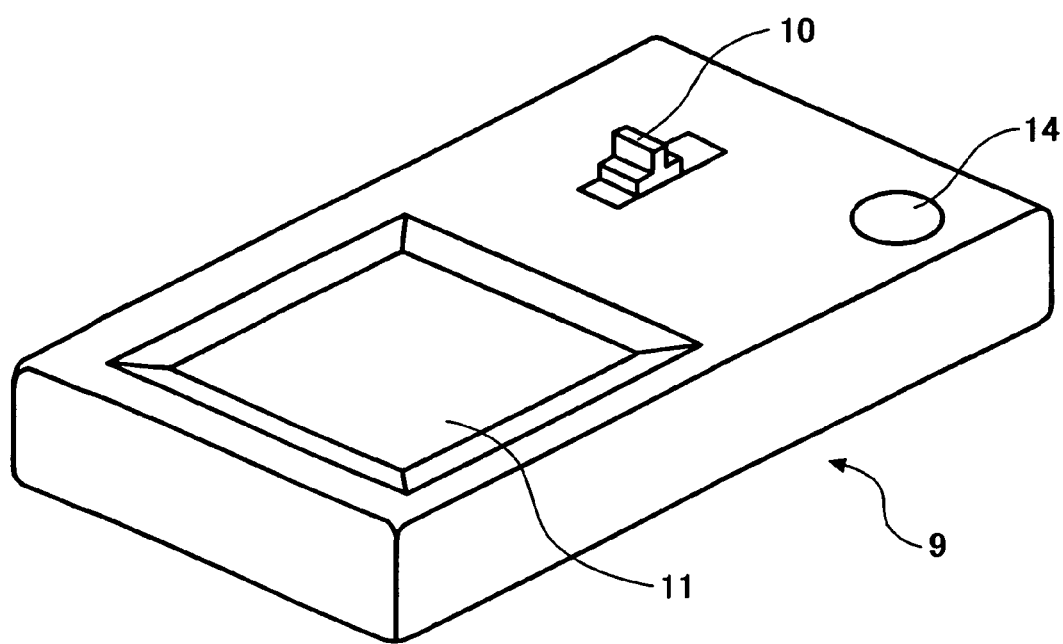
FIG. 3 is a perspective view of the portable device of FIGS. 1A and 1B.

As illustrated in FIG. 3, the portable device 9 is in a substantially flat rectangular shape, and includes an LCD panel 11, a slide operation switch 10 such as a zoom operation lever and a push button switch 14 at an upper surface thereof.

As illustrated in FIG. 2A, the cover 2 of the waterproof case 1 is rotatably provided around a shaft 2a at one side end of the waterproof case 1 so as to open and close an opening at a left side end surface of the case body 1a in FIG. 2A. The cover 2 is closed tightly and locked by engaging a lock member 13 with a hook 2b provided at a free end side of the cover 2. Further, the O-ring 8 is provided between the cover 2 and the case body 1a to make the waterproof case 1 watertight. The O-ring 8 is provided around the left side end surface of the case body 1a.

In order to operatively cooperate an operation part of the portable device 9 (i.e., the LCD panel 11) recessed in a direction perpendicular to an inserting direction of the portable device 9 into the waterproof case 1 with an operation part of the waterproof case 1 (i.e., the recessed part 3), and in order to operatively cooperate another operation part of the portable device 9 (i.e., the slide operation switch 10 and the push button switch 14) projected in a direction perpendicular to an inserting direction of the portable device 9 with another operation part of the waterproof case 1 (i.e., the first and second operation levers 4 and 12), the waterproof case 1 includes the moving member 5 configured to move the portable device 9 in a direction perpendicular to an inserting direction of the portable device 9 after the portable device 9 is inserted into the waterproof case 1.

As illustrated in FIGS. 1A and 1B, the moving member 5 is rotatably provided around a shaft 6 at the bottom surface of the case body 1a. The shaft 6 extends in parallel with the bottom surface of the case body 1a. The moving member 5 includes a protrusion part 5a on an inner side surface near a free end part thereof. The protrusion part 5a is watertightly finable in a through hole 1b formed at a substantially central part of a bottom part of the case body 1a. When the protrusion part 5a is fitted in the through hole 1b, the protrusion part 5a passes through the bottom part of the case body 1a and pushes up the bottom surface of the portable device 9 inserted into the waterproof case 1. As a result, the LCD panel 11 of the portable device 9 is brought into tight contact with the recessed part 3 of the waterproof case 1, and the slide operation switch 10 and the push button switch 14 of the portable device 9 can cooperate with the first and second operation levers 4 and 12 of the waterproof case 1, respectively.

The protrusion part 5a of the moving member 5 is tightly engaged with the through hole 1b of the bottom part of the case body 1a, thereby functioning as a stopper that makes the waterproof case 1 watertight and functioning as a holding member that holds the portable device 9 in the moved position. Because the protrusion part 5a serves as the stopper, an O-ring need not be provided around the through hole 1b of the bottom case of the case body 1a. Therefore, the size and cost of the waterproof case 1 may be reduced. The whole moving member 5, or at least the protrusion part 5a, is preferably formed from a flexible member such as an elastic member, for example waterproof rubber. The elastic member may absorb shocks such as those due to vibrations and dropping of the portable device 9 held in the waterproof case 1.

According to the above-described embodiment of the present invention, the moving member 5 is configured to push up the portable device 9 by the protrusion part 5a functioning as a pushing-up member pushed up through the through hole 1b by a user's operation. The protrusion part 5a also functions as a holding member that holds the portable device 9 in the pushed up position by the engagement force of the protrusion part 5a with the through hole 1b. Therefore, the moving member 5 and the protrusion part 5a form a moving and holding device in this embodiment.

FIG. 1A illustrates the waterproof case 1 and the portable device 9 in a state where the portable device 9 is held in the pushed up position in the waterproof case 1 by the engagement force of the protrusion part 5a with the through hole 1b. In this state, the moving member 5 projects by no less than the height of the projections 7 provided at side edge parts of the bottom part of the case body 1a. Alternatively, the bottom surface of the moving member 5 and the bottom surfaces of the projections 7 may be in the same plane.

When the portable device 9 is in the pushed up position in the waterproof case 1 as illustrated in FIG. 1A, the slide operation switch 10 and the push button switch 14 of the portable device 9 may be operated by the operations of the first and second operation levers 4 and 12 of the waterproof case 1, respectively. As illustrated in FIG. 2B, in order to maintain the watertightness of the waterproof case 1, the first operation lever 4 is constructed to rotate around a shaft 4a that watertightly penetrates an upper case of the case body 1a. Further, a fork-shaped member 4b is integrally provided at an end portion of the shaft 4a at an inner surface side of the upper case of the case body 1a as illustrated by the dotted lines in FIG. 2B. In order to make the rotatable first operation lever 4 cooperate with the slide operation switch 10 of the portable device 9, the fork-shaped member 4b pinches the slide operation switch 10, thereby causing the rotation motion of the first operation lever 4 to change to the sliding motion of the slide operation switch 10. With the above-described construction of the first operation lever 4 of the waterproof case 1 and the slide operation switch 10 of the portable device 9, the first operation lever 4 cooperates with the slide operation switch 10 in a watertight manner.

FIG. 1B illustrates the waterproof case 1 and the portable device 9 in a state where the moving member 5 rotates around the shaft 6 to disengage from the hole 1b. In this state, the bottom surface of the portable device 9 can contact the inner surface of the bottom case of the case body 1a of the waterproof case 1.

The recessed part 3 of the waterproof case 1 is formed from a transparent and flexible material such as plastic. Therefore, a user may see the LCD panel 11 of the portable device 9 through the recessed part 3 of the waterproof case 1 and may input operational instructions to the portable device 9 with a touch of the LCD panel 11 by fingers or by use of a pen.

Figure 4:
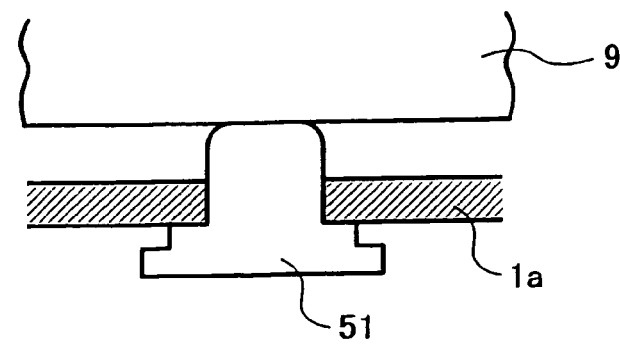
FIG. 4 is a schematic view of an alternative construction of a moving and holding device of the waterproof case.

As one non-limiting alternative to the above-described moving member 5 that rotates around the shaft 6, the moving member 5 may be constructed of a single pushing-up member 51 as illustrated in FIG. 4. The pushing-up member 51 may be shaped like the above-described protrusion part 5a of the moving member 5. In this alternative construction, after a user inserts the portable device 9 into the waterproof case 1, the user presses the pushing-up member 51 into a through hole formed in the bottom part of the case body 1a of the waterproof case 1. Thereby, the pushing-up member 51 pushes up the portable device 9 in a direction perpendicular to the inserting direction of the portable device 9. In addition, the pushing-up member 51 functions as a holding member that holds the portable device 9 in a pushed up position by an engagement force of the pushing-up member 51 with the through hole. When the user wishes to remove the portable device 9 from the waterproof case 1, the user first pulls the pushing-up member 51 out of the through hole. According to the alternative construction of the moving and holding device including the pushing-up member 51, the moving and holding device has a simple construction.

Figure 5A:
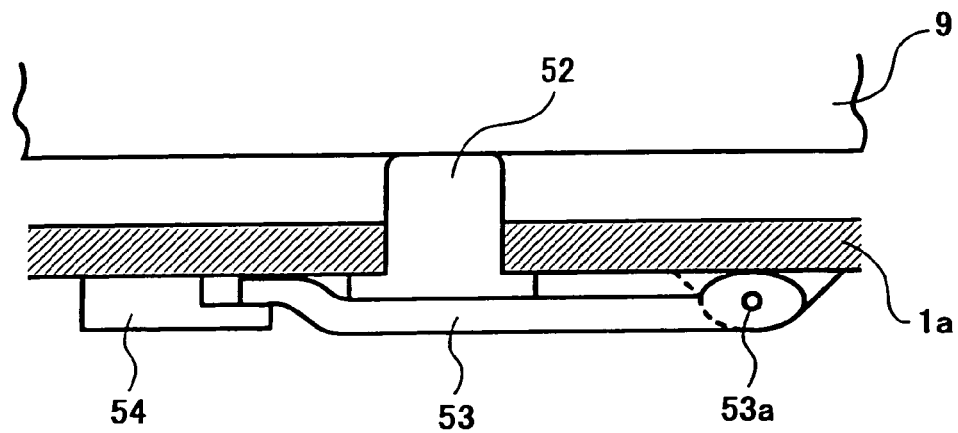
FIG. 5A is a schematic cross-sectional view of a moving and holding device and a fixing device of the waterproof case according to another embodiment of the present invention.
Figure 5B:
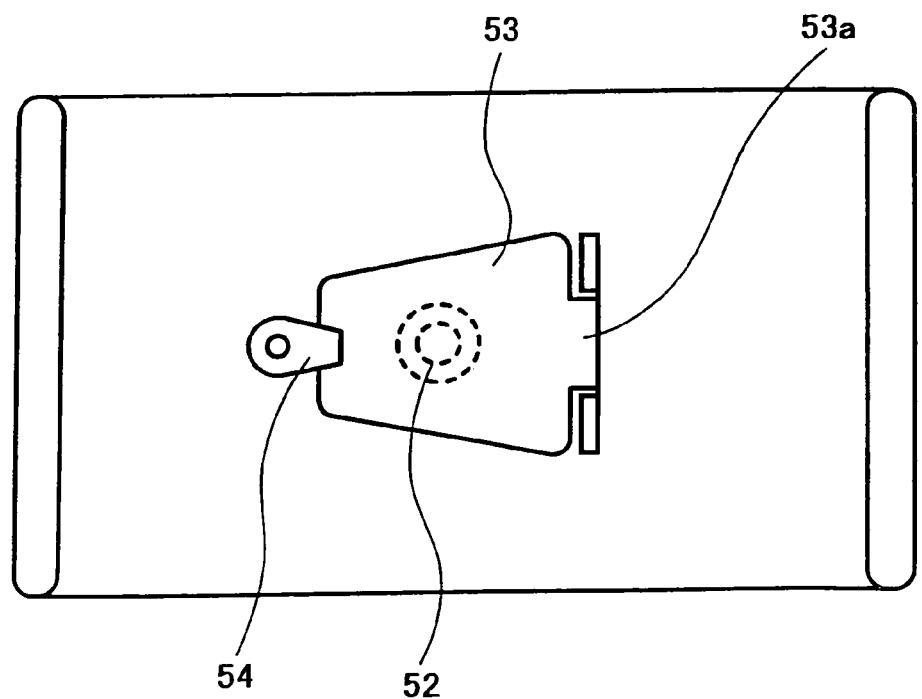
FIG. 5B is a schematic bottom view of the waterproof case of FIG. 5A.

FIGS. 5A and 5B illustrate the waterproof case 1 according to another embodiment of the present invention. Referring to FIGS. 5A and 5B, the waterproof case 1 includes a moving and holding device and a fixing device at the bottom part of the case body 1a. The moving and holding device of this embodiment includes a pushing-up member 52 similar to the pushing-up member 51 of FIG. 4, and the fixing device includes a fixing member 53 and a hook 54. Similarly as with the pushing-up member 51 of FIG. 4, the pushing-up member 52 is configured to watertightly engage with a through hole formed in the bottom case of the case body 1a of the waterproof case 1 and configured to push up the portable device 9 in a direction perpendicular to the inserting direction of the portable device 9. The pushing-up member 52 also functions as a holding member that holds the portable device 9 in a pushed up position by an engagement force of the pushing-up member 52 with the through hole.

The fixing member 53 is configured to rotate around a shaft 53a provided to the bottom case of the case body 1a. When the fixing member 53 is rotated to a position in which the fixing member 53 is in parallel with the bottom case of the case body 1a, the fixing member 53 covers the pushing-up member 52. When the fixing member 53 is in this position, a tip end portion of the fixing member 53 engages with a hook 54, thereby fixing the pushing-up member 52 in the waterproof case 1 and preventing the pushing-up member 52 from falling from the through hole.

When a user wishes to remove the portable device 9 from the waterproof case 1, the user first disengages the fixing member 53 from the hook 54 and rotates the fixing member 53 around the shaft 53a to uncover the pushing-member 52. Subsequently, the user pulls the pushing-up member 52 out of the through hole.

In the waterproof case 1 including the above-described moving and holding device and the fixing device according to the embodiment of the present invention, the fixing member 53 is configured to fix the pushing-up member 52 in the waterproof case 1, so that the pushing-up member 52 may securely hold the portable device 9 in the pushed up position by the engagement force of the pushing-up member 52 with the through hole.

Figure 6A:
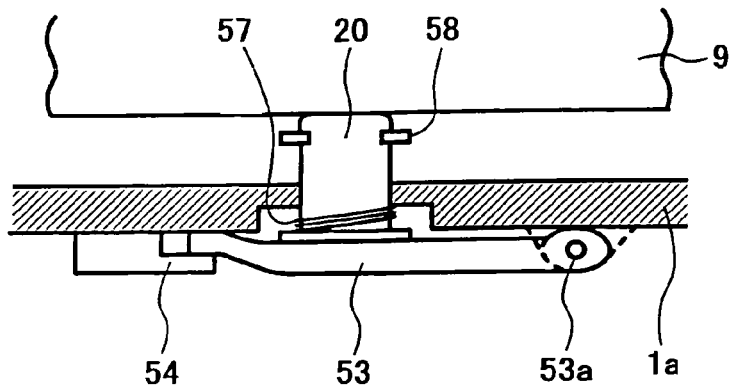
FIGS. 6A and 6B are schematic cross-sectional view of a moving and holding device and a fixing device of the waterproof case according to another embodiment of the present invention.
Figure 6B:
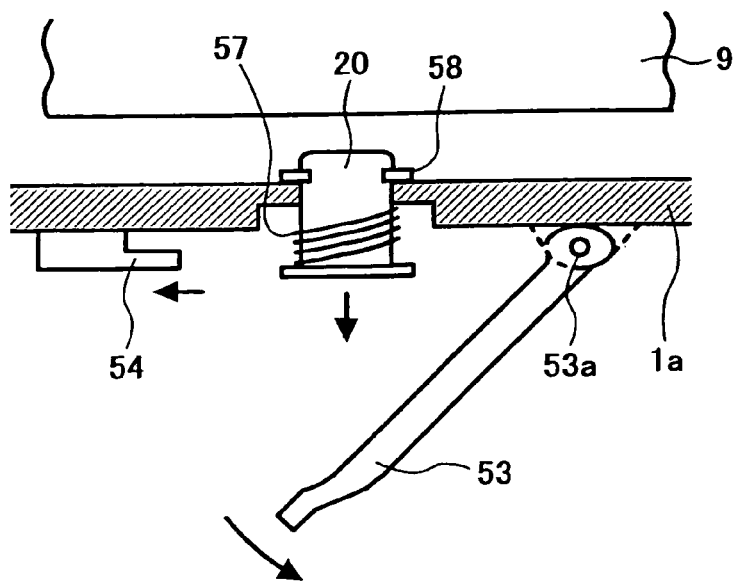

FIGS. 6A and 6B illustrate the waterproof case 1 according to another embodiment of the present invention. Referring to FIGS. 6A and 6B, the waterproof case 1 includes a moving and holding device and a fixing device at the bottom part of the case body 1a. The moving and holding device of FIGS. 6A and 6B has a similar construction to that of the moving and holding device of FIGS. 5A and 5B except for a pushing-up member 20. The fixing device of FIGS. 6A and 6B has the same construction as that of the fixing device of FIGS. 5A and 5B.

Specifically, the moving and holding device includes the pushing-up member 20 slidably provided in a waterproof manner in a through hole formed in the bottom case of the case body 1a of the waterproof case 1. A stop ring such as an E-ring is provided to the upper part of the pushing-up member 20 to prevent the pushing-up member 20 from falling from the through hole. Further, a coil spring 57 is provided with the pushing-up member 20 to bias the pushing-up member 20 out from the through hole.

In the waterproof case 1 of this embodiment, the portable device 9 inserted into the waterproof case 1 is pushed up by rotating the fixing member 53 around the shaft 53a while pressing the pushing-up member 20 toward the portable device 9. Similarly as in the fixing device of FIGS. 5A and 5B, the tip end portion of the fixing member 53 engages with the hook 54, thereby fixing the pushing-up member 20 in the waterproof case 1. As a result, the pushing-up member 20 holds the portable device 9 in a pushed up position.

When a user disengages the fixing member 53 from the hook 54 and rotates the fixing member 53 around the shaft 53a to uncover the pushing-up member 20, the pushing-up member 20 slides down through the through hole by the bias force of the coil spring 57 and is brought to a stop by the stop ring 58 as illustrated in FIG. 6B.

In the waterproof case 1 including the above-described moving and holding device and the fixing device according to the embodiment of the present invention, because the pushing-up member 20 slides down through the through hole by the bias force of the coil spring 57, a user can smoothly remove the portable device 9 from the waterproof case 1. Further, because the stop ring 58 serves as a stopper that prevents the pushing-up member 20 from falling from the through hole, the possibility that the user loses the pushing-up member 20 may be reduced.

Figure 7:
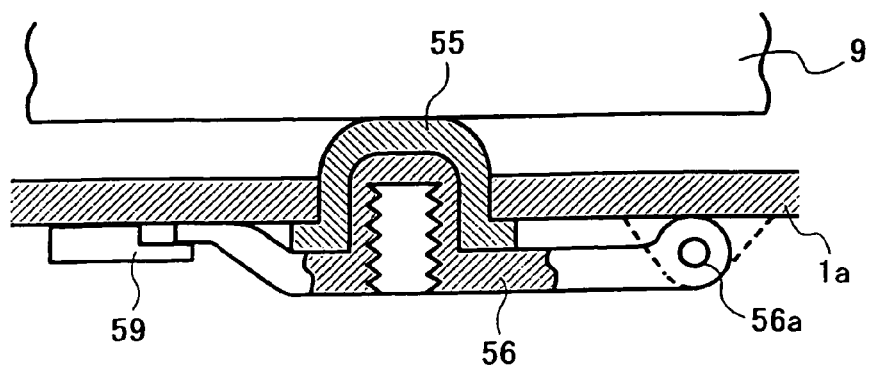
FIG. 7 is a schematic cross-sectional view of a moving and holding device and a fixing device of the waterproof case according to another embodiment of the present invention.

FIG. 7 illustrates the waterproof case 1 according to another embodiment of the present invention. Referring to FIG. 7, the waterproof case 1 includes a moving and holding device and a fixing device at the bottom part of the case body 1a. The moving and holding device and the fixing device of this embodiment have similar constructions to those of the moving and holding device and the fixing device of FIG. 5A except that the fixing device has a seat for receiving a tripod for the portable device 9 such as a camera.

Specifically, the moving and holding device and the fixing device of FIG. 7 include a pushing-up member 55, a fixing member 56, and a hook 59 having similar functions to those of the pushing-up member 52, the fixing member 53 and the hook 54 of FIGS. 5A and 5B, respectively.

As illustrated in FIG. 7, the pushing-up member 55 configured to engage with a through hole formed in the bottom case of the case body 1a of the waterproof case 1 is formed with a downwardly directed opening. Further, a projection part integrally formed with the fixing member 56 is configured to engage with the opening of the pushing-up member 55. A screw-tapped hole directed downward is formed in the projection part of the fixing member 56. The screw-tapped hole of the fixing member 56 can engage with a screw of a tripod. The fixing member 56 is rotatably provided with the bottom case of the case body 1a around a shaft 56a.

In the waterproof case 1 of this embodiment, the portable device 9 is pushed up in a direction perpendicular to the inserting direction of the portable device 9 by an engagement force of the pushing-up member 55 with the through hole formed in the bottom case of the case body 1a. Further, the projection part of the fixing member 56 engages with the opening of the pushing-up member 55 by rotating the fixing member 56 around the shaft 56a toward the bottom case of the case body 1a of the waterproof case 1. Subsequently, a tip end portion of the fixing member 56 engages with the hook 59, thereby fixing the pushing-up member 55 in the waterproof case 1.

The portable device 9 suitable for use in the above-described waterproof case 1 includes various types of cameras such as a digital camera, a video camera, etc. Various types of photographing modes such as a photographing mode by use of a self-timer, a photographing mode by remote control, etc. may be performed by use of a tripod engageable with the screw-tapped hole in the fixing member 56 of the waterproof case 1. By use of the tripod for the waterproof case 1 containing the above-described cameras, occurrence of image blurring caused by a camera shake may be obviated.

In this embodiment, the pushing-up member 55 and the fixing member 56 are separately provided to the bottom case of the case body 1a of the waterproof case 1. Alternatively, the pushing-up member 55 may be integrally formed with the fixing member 56.

Figure 8A:
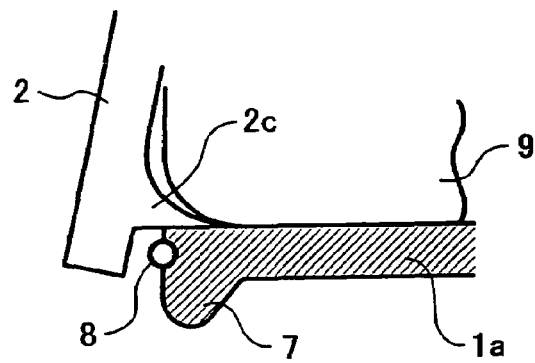
FIGS. 8A through 8C are schematic views of a part of the waterproof case for explaining operations of pushing up the portable device by use of a projection part of a cover of the waterproof case according to the embodiments of the present invention.
Figure 8B:
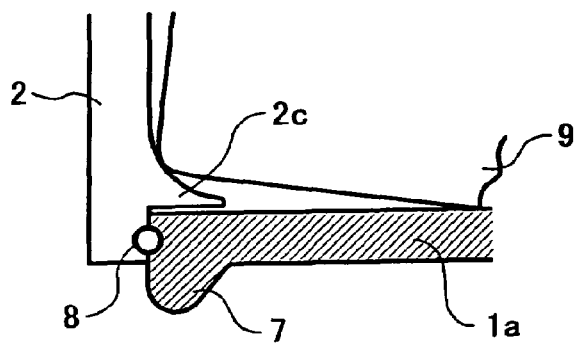
Figure 8C:
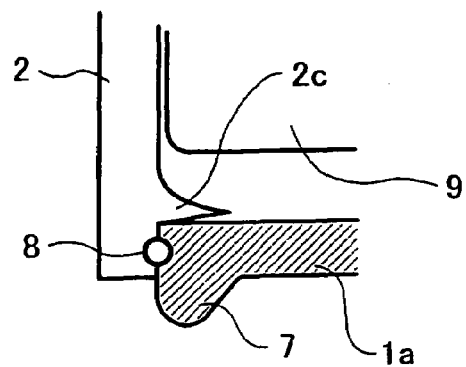

Referring now to FIGS. 8A through 8C, a wedge-shaped projection 2c is formed with the cover 2 at a position near a free end part of the cover 2. The position and shape of the projection 2c is determined on the condition that the projection 2c may be inserted between the bottom surface of the portable device 9 and the inner surface of the bottom case of the case body 1a, to separate the bottom surface of the portable device 9 from the inner surface of the bottom case of the case body 1a when the cover 2 closes the opening of the case body 1a after the portable device 9 is inserted into the waterproof case 1.

FIG. 8B illustrates a part of the waterproof case 1 in a state that the cover 2 is closed. In this state, as illustrated in FIG. 8B, a bottom part of the portable device 9 at the side of the cover 2 is lifted by the projection 2c, and thereby the portable device 9 slants downward in the waterproof case 1.

After the bottom part of the portable device 9 at the side of the cover 2 is lifted by the projection 2c, the slanted portable device 9 may be easily pushed up and held in a pushed up position by the above-described moving and holding device and the fixing device as illustrated in FIG. 8C.

The projection 2c may be integrally formed with the cover 2. Alternatively, the projection 2c may be attached to the cover 2. In both cases, the projection 2c may be preferably formed from waterproof rubber.

Figure 9A:
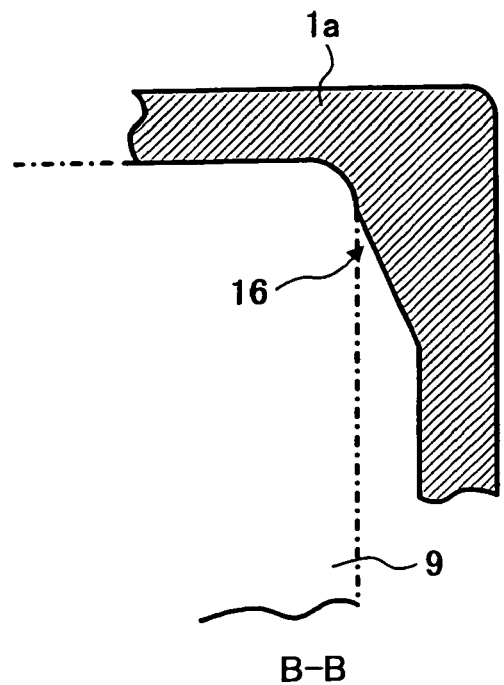
FIG. 9A is a cross-sectional view of an upper corner part of the waterproof case taken substantially along a line A-A of FIG. 2A.
Figure 9B:
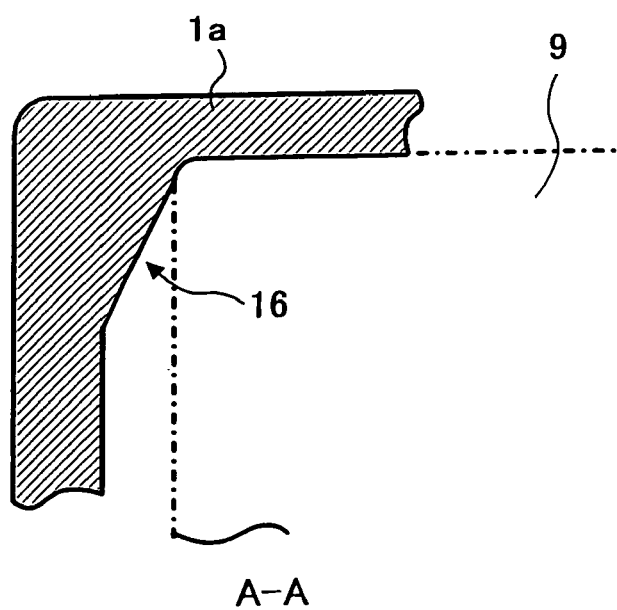
FIG. 9B is a cross-sectional view of an upper corner part of the waterproof case taken substantially along a line B-B of FIG. 2A.
Figure 10:
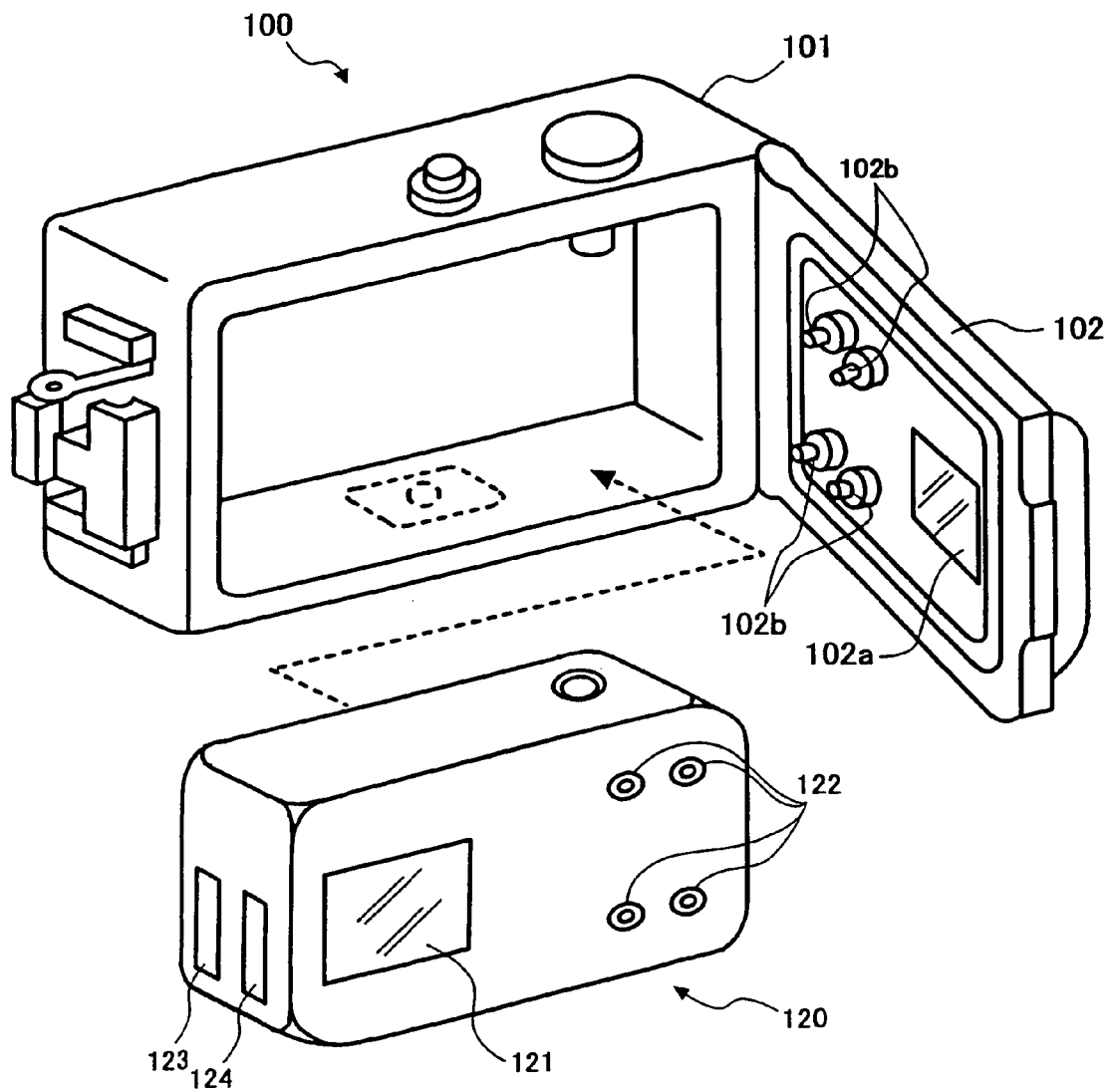
FIG. 10 illustrates a schematic perspective view of a waterproof case and a portable device according to a background art.

It is preferable to provide a positioning guide that positions the portable device 9 at a pushing-up end position in the waterproof case 1. FIG. 9A is a cross-sectional view of an upper corner part of the waterproof case 1 taken substantially along the line A-A of FIG. 2A. FIG. 9B is a cross-sectional view of an upper corner part of the waterproof case 1 taken substantially along the line B-B of FIG. 2A.

As illustrated in FIGS. 9A and 9B, a positioning guide 16 is formed at at least one inner surface corner in the vicinity of the upper case of the case body 1a so as to position the portable device 9 at a pushing-up end position in the waterproof case 1 when the portable device 9 is pushed up in a direction perpendicular to the inserting direction of the portable device 9 into the waterproof case 1.

Specifically, the positioning guide 16 is formed from a sloping surface of the inner wall of the case body 1a, sloping inwardly as it approaches the upper case of the case body 1a. When the portable device 9 is pushed up in the waterproof case 1, the upper end edge of the portable device 9 is guided by the positioning guide 16 and is then securely positioned at the predetermined position in the waterproof case 1 after a pushing-up operation by a user is completed.

According to the above-described embodiments of the present invention, the cover 2 that opens and closes the opening of the case body 1a is provided at one end in a longitudinal direction of the rectangular shaped waterproof case 1, thereby allowing the size of the cover 2 to be relatively small. Accordingly, the peripheral length of the O-ring 8 may become short, so that the waterproofness of the waterproof case 1 may be enhanced. Further, because the size of the cover 2 is relatively small, occurrences of deformation of the cover 2 due to water pressure and water leakage caused by the deformation of the cover 2 may be restrained.

If the portable device 9 includes a cover for electric battery or a cover for a CF card or a PC card that opens and closes in the inserting direction of the portable device 9 into the waterproof case 1, a user can open and close the cover just by opening the cover 2 without removing the portable device 9 from the waterproof case 1.

The waterproof case 1 according to the embodiments of the present invention may be used for various types of cameras, a personal digital assistance (PDA), a portable game device, a mobile phone, etc. In case of using a camera in the waterproof case 1, the operation part projected or recessed in a direction perpendicular to an inserting direction of the portable device 9 into the waterproof case 1 may include a shutter release button, a power supply switch, a photographing mode selecting button, etc.

Numerous additional modifications and variations of the present invention are possible in light of the above teachings. It is therefore to be understood that within the scope of the appended claims, the present invention may be practiced otherwise than as specifically described herein.

This document claims priority and contains subject matter related to Japanese Patent Application No. 2001-080287 filed in the Japanese Patent Office on Mar. 21, 2001, and the entire contents of each of which are hereby incorporated herein by reference.

What is claimed as new and is desired to be secured by Letters Patent of the United States is:

1. A portable device waterproof case comprising:
an opening configured to receive a portable device including a device operation part being inserted therethrough in an inserting direction;
a case operation part provided on a first surface of the waterproof case that is substantially perpendicular to the inserting direction and configured to operatively cooperate with the device operation part of the portable device when the case operation part and the device operation part are engaged with each other;
a moving and holding device configured to move the portable device to a moved position in a direction substantially perpendicular to the inserting direction and to hold the portable device at the moved position so as to cause the case operation part of the case and the device operation part of the portable device to be engaged with each other, the moving and holding device including:
a push-up member configured to push up the portable device through a through hole provided on a second surface of the waterproof case that substantially faces the first surface and to engage with the through hole to generate engagement force, the engagement force allowing the moving and holding device to hold the portable device at the moved position and allowing the waterproof case to be watertight;
a support shaft configured to connect the push-up member with the second surface of the waterproof case so as to cause the push-up member to rotate around the support shaft; and
a fixing device provided on the second surface of the waterproof case and configured to fix the push-up member at a pushed-up position of the push-up member.

2. The waterproof case according to claim 1, wherein:
the push-up member is configured to be inserted into the through hole provided on the second surface of the waterproof case,
and wherein the fixing device is configured to fix the push-up member being inserted into the through hole at the second surface of the waterproof case.

3. The waterproof case according to claim 1, wherein the portable device is a camera, and the push-up member further includes a support for receiving a tripod used for the camera.

4. The waterproof case according to claim 1, wherein the push-up member is formed of elastic material.

5. The waterproof case according to claim 1, wherein the moving and holding device further includes:
a positioning guide provided on at least one of inner surfaces of the waterproof case and configured to cause the portable device to stay at the moved position when the portable device is moved in the inserting direction.

6. The waterproof case according to claim 1, wherein at least one of the case operation part of the waterproof case and the device operation part of the portable device includes a liquid crystal display panel.

7. The waterproof case according to claim 1, wherein at least one of the case operation part of the waterproof case and the device operation part of the portable device includes a zoom operation lever.

8. A portable device waterproof case comprising:
an opening configured to receive a portable device including a device operation part being inserted therethrough in an inserting direction;
a case operation part provided on a first surface of the waterproof case that is substantially perpendicular to the inserting direction and configured to operatively cooperate with the device operation part of the portable device when the case operation part and the device operation part are engaged with each other;
a moving and holding device configured to move the portable device to a moved position in a direction substantially perpendicular to the inserting direction and to hold the portable device at the moved position so as to cause the case operation part of the case and the device operation part of the portable device to be engaged with each other, the moving and holding device including:
a push-up member configured to push up the portable device through a through hole provided on a second surface of the waterproof case that substantially faces the first surface and to engage with the through hole to generate engagement force, the engagement force allowing the moving and holding device to hold the portable device at the moved position and allowing the waterproof case to be watertight;
a bias force applying member provided on the push-up member and configured to apply a bias force to the push-up member in the direction opposing the inserting direction;
a fixing device provided on the second surface of the waterproof case and configured to fix the push-up member at a pushed-up position by applying a force opposing the bias force of the bias force applying member; and
a stop member provided on the push-up member and configured to prevent the push-up member from separating from the waterproof case when the force of the fixing device is not applied.

9. A portable device waterproof case comprising:
an opening configured to receive a portable device including a device operation part being inserted therethrough in an inserting direction;
a case operating means provided on a first surface of the waterproof case that is substantially perpendicular to the insertion direction and configured to operatively cooperate with the device operation part of the portable device when the case operation means and the device operation part are engaged with each other;
a moving and holding means for moving the portable device to a moved position in a direction substantially perpendicular to the inserting direction and to hold the portable device at the moved position to cause the case operating means of the case and the device operation part of the portable device to be engaged with each other, the moving and holding means including:
a push-up means configured to push up the portable device through a through hole provided on a second surface of the waterproof case that substantially faces the first surface and to engage with the through hole to generate engagement force, the engagement force allowing the moving and holding means to hold the portable device at the moved position and allowing the waterproof case to be watertight;
a supporting means connecting the push-up means with the second surface of the waterproof case for causing the push-up means to rotate around the supporting means; and
a fixing means provided on the second surface of the waterproof case for fixing the push-up means at a pushed-up position of the push-up means.

* * * * *